United States Patent
Yau et al.

(10) Patent No.: US 7,897,655 B2
(45) Date of Patent: *Mar. 1, 2011

(54) INK JET INK COMPOSITION

(75) Inventors: Hwei-Ling Yau, Rochester, NY (US);
David S. Uerz, Ontario, NY (US);
Wendy S. Krzemien, Hilton, NY (US);
Charles R. Salerno, Newark, NY (US)

(73) Assignee: Eastman Kodak Company, Rochester, NY (US)

( * ) Notice: Subject to any disclaimer, the term of this patent is extended or adjusted under 35 U.S.C. 154(b) by 970 days.

This patent is subject to a terminal disclaimer.

(21) Appl. No.: 10/984,092

(22) Filed: Nov. 9, 2004

(65) Prior Publication Data

US 2006/0100306 A1    May 11, 2006

(51) Int. Cl.
| | |
|---|---|
| B05D 1/32 | (2006.01) |
| B05D 3/02 | (2006.01) |
| B41J 2/01 | (2006.01) |
| B41J 2/17 | (2006.01) |
| C08G 18/08 | (2006.01) |
| C08J 3/00 | (2006.01) |
| C08K 3/20 | (2006.01) |
| C08L 75/00 | (2006.01) |
| C09D 11/00 | (2006.01) |
| G01D 11/00 | (2006.01) |

(52) U.S. Cl. ............... 523/160; 347/1; 347/95; 347/98; 347/100; 427/466; 427/385.5; 427/372.2; 523/161; 524/507; 524/591; 524/839; 524/840

(58) Field of Classification Search ........... 524/507, 524/591, 839, 840; 523/160, 161; 427/466, 427/385.5, 372.2; 347/1, 95, 98, 100
See application file for complete search history.

(56) References Cited

U.S. PATENT DOCUMENTS

| | | | |
|---|---|---|---|
| 4,914,148 A | 4/1990 | Hille et al. | |
| 5,605,750 A | 2/1997 | Romano et al. | |
| 5,723,211 A | 3/1998 | Romano et al. | |
| 5,789,070 A | 8/1998 | Shaw-Klein et al. | |
| 6,045,917 A | 4/2000 | Missell et al. | |
| 6,079,821 A | 6/2000 | Chwalek et al. | |
| 6,087,051 A | 7/2000 | Shoji et al. | |
| 6,217,163 B1 | 4/2001 | Anagnostopoulos et al. | |
| 6,268,101 B1 | 7/2001 | Yacobucci et al. | |
| 6,450,619 B1 | 9/2002 | Anagnostopoulos et al. | |
| 6,604,819 B2 | 8/2003 | Nishita | |
| 7,449,501 B2 | 11/2008 | Uerz et al. | |
| 2002/0009547 A1 | 1/2002 | Ito et al. | |
| 2002/0086933 A1 | 7/2002 | Matzinger | |
| 2002/0156153 A1 | 10/2002 | Tsang et al. | |
| 2003/0005945 A1 | 1/2003 | Onishi et al. | |
| 2003/0043223 A1 | 3/2003 | Delametter et al. | |
| 2003/0117465 A1 | 6/2003 | Chwalek et al. | |
| 2003/0184629 A1 | 10/2003 | Valentini et al. | |
| 2003/0189626 A1 | 10/2003 | Kataoka et al. | |
| 2003/0193553 A1 | 10/2003 | Issler | |
| 2004/0017406 A1 | 1/2004 | Kato et al. | |
| 2004/0032473 A1 | 2/2004 | Ishimoto et al. | |
| 2004/0100542 A1 | 5/2004 | Chen et al. | |
| 2006/0100307 A1 | 5/2006 | Uerz et al. | |
| 2006/0100308 A1 | 5/2006 | Yau et al. | |

FOREIGN PATENT DOCUMENTS

| | | |
|---|---|---|
| EP | 0 751 194 A2 | 1/1997 |
| EP | 0 813 978 A1 | 12/1997 |
| EP | 1 167 466 | 1/2002 |
| EP | 1 245 402 | 10/2002 |
| EP | 1 424 374 A1 | 6/2004 |
| EP | 1 437 391 A1 | 7/2004 |
| JP | 2000-001639 | 1/2000 |
| JP | 2000-225695 | 8/2000 |
| JP | 2002-144551 | 5/2002 |
| JP | 2003-291484 | 10/2003 |
| WO | WO 00/52106 | 9/2000 |

*Primary Examiner* — Patrick D Niland
(74) *Attorney, Agent, or Firm* — Sarah Meeks Roberts

(57) ABSTRACT

This invention relates to an ink jet ink composition comprising an aqueous medium and at least two different polymers, a first polymer and a second polymer, having a weight average acid number of 70 to 200. In one embodiment the ink is substantially colorless.

38 Claims, No Drawings

INK JET INK COMPOSITION

FIELD OF THE INVENTION

This invention relates to an aqueous inkjet ink composition that has excellent printer reliability performance and image durability. In one embodiment the composition is substantially colorless.

BACKGROUND OF THE INVENTION

Ink jet printing is a non-impact method for producing printed images by the deposition of ink droplets in a pixel-by-pixel manner to an recording element in response to digital data signals. There are various methods that may be utilized to control the deposition of ink droplets on the recording element to yield the desired printed image. In one process, known as drop-on-demand ink jet, individual ink droplets are projected as needed onto the recording element to form the desired printed image. Common methods of controlling the projection of ink droplets in drop-on-demand printing include piezoelectric transducers and thermal bubble formation. In another process, known as continuous ink jet, a continuous stream of droplets is charged and deflected in an image-wise manner onto the surface of the recording element, while unimaged droplets are caught and returned to an ink sump. Ink jet printers have found broad applications across markets ranging from desktop document and photographic-quality imaging, to short run printing and industrial labeling.

It is well known in the art that printed images generated using ink jet technology are not very stable with regard to environmental effects of light and ozone. Another problem with such printed images is that they are easily scratched during handling, especially when pigmented inks are used, and are not resistant to typical aqueous solutions such as coffee, fruit punch, etc.

Several methods have been used to protect printed images generated using ink jet technology. One method is referred to as lamination and involves the application of a clear durable film over the printed image. Another method involves printing onto specially designed ink jet recording elements which are subsequently fused to form a clear durable film over the printing image. Both of these methods have drawbacks in that an integral or peripheral fusing station is required.

Another method for increasing the durability of printed images involves application of an overcoat composition onto the surface of the printed image using a brush, roller, sponge, etc. As the composition dries, a clear durable film is formed. This method is useful in a variety of commercial printing applications but is considered too impractical and undesirable for consumer use in the home. To this end, the use of a colorless ink supplied in a printhead of an ink jet printer has become increasingly popular. The printhead containing the colorless ink is typically part of the same carriage assembly containing colored inks, and the printer is instructed to jet the colorless ink either simultaneously with or after the colored inks are jetted.

U.S. Pat. No. 6,087,051; U.S. 2003/0193553 A1; U.S. 2003/0005945 A1; JP 2003-291484 A; JP 2000-225695 A; and JP 2002-144551 A describe methods of ink jet printing wherein a colorless ink is used to equalize gloss and/or provide image permanence. These references describe the use of polyurethanes in the colorless inks, but do not describe how the physical properties of the polyurethanes should be optimized in order to obtain jettability over extended periods of time, and at the same time, provide stain and durability for images printed on a variety of media.

U.S. 2002/0156153 A1 describes the use of polymeric additives in fixatives for ink jet printing in order to improve print quality and image permanence attributes on plain paper. This application discloses that a wide variety of polymers can be used, as long the polymer Tg, melting temperature, and molecular weight each fall into a particular range. The problem with this invention is that high amounts of organic solvents are needed for jetting, making the fixatives environmentally unfriendly and unsuitable for use on glossy ink jet recording elements.

U.S. Pat. No. 6,604,819 B2 relates to an ink jet image recording method that includes application of a solution having fine polymer particles during or after printing colored inks in order to provide weatherfastness. This patent states that the particles must have a weight average molecular weight of at least 100,000 such that a film is formed therefrom. This patent discloses the use of polyurethanes, but polyurethanes having a weight average molecular weight of at least 100,000 are not jettable using an thermal ink jet printhead.

U.S. 2002-0009547 A1 relates to a coating liquid for application to recorded images in order to provide image permanence, fixation and glossiness. This application discloses that fine polymer particles may be used in the coating liquid, and that it is especially desirable if the particles have an acid number of 100 or less.

Regardless of the above, there is a continuing need for inks and for protective coatings for images that have good jetting and printer reliability performance as well as stain resistance and rub resistance.

SUMMARY OF THE INVENTION

This invention provides an ink jet ink composition comprising an aqueous medium and at least two different polymers, a first polymer and a second polymer, having a weight average acid number of 70 to 200. It further provides an ink jet ink set comprising at least one substantially colorless ink composition comprising an aqueous medium and at least two different polymers, a first polymer and a second polymer, having a weight average acid number of 70 to 200; and at least one colored ink comprising an aqueous medium and a pigment or a dye.

The inks of this invention have an excellent balance of printer reliability performance and durability. They are stain resistant and rub resistant, particularly when used as a protective ink.

DETAILED DESCRIPTION OF THE INVENTION

The ink jet ink composition of the invention comprises an aqueous medium and at least two different polymers, a first polymer and a second polymer, having a weight average acid number of 70 to 200. The ink may be colored ink or, in one embodiment, a substantially colorless ink which is used as a protective ink. A substantially colorless ink includes inks which may have some tinting to improve the color balance of the final image. However, by substantially colorless it is intended that such inks do not form the image itself. Rather, they are used as a protective coating or to change or enhance the gloss of the final image. The composition may also comprise one or more additional polymers provided that the weight average acid number of all of the polymers is 70 to 200. The "weight average acid number" equals the weight percent of the $1^{st}$ polymer times the acid number of the 1st polymer+weight percent of the $2^{nd}$ polymer times the acid number of the $2^{nd}$ polymer, etc. The total weight percent of all polymers should equal 100 percent. Preferably at least two different polymers have a weight average acid number of 80 to 160. In a preferred embodiment the first polymer has an acid number of 60 to 100 and the second polymer has an acid number of 180 to 240.

Preferably the two different polymers are of two different classes of polymers. Examples of useful polymers include polyester, polyurethane or polymers derived from styrene and/or acrylic acid derivatives. Useful polymers will be described in more detail below. Preferably the first polymer is a condensation polymer and the second polymer is an addition polymer. It is also preferred that the molecular weight of both polymers is independently within the range of 6,000 to 30,000. In one embodiment of the invention the first polymer is a condensation polymer that has an acid number of 60 to 100 and a molecular weight of greater than 10,000, and the second polymer is an addition polymer that has an acid number greater than 180 and a molecular weight of less than 18,000. It is particularly preferred that the first polymer is a polyurethane polymer and the second polymer is an acrylic polymer.

Examples of useful condensation polymers include polyesters, polycarbonates, polyamides, polyimides, polyurethanes, polyethers, and polysiloxane. When the first polymer is a polyurethane, it has an acid number of 60 to 100, and preferably from 70 to 90. When used herein, the term "acid number", also known as "acid value", is defined by the number of milligrams of potassium hydroxide required to neutralize one gram of polymer. Thus, the acid number of a given polymer is related to the percent of acid-containing monomer or monomers. The higher the acid number, the more acid functionality is present in the polymer. The inventors have found that if the acid number is too high (greater than 100), then the ink jet ink composition will not provide adequate stain protection, and if the acid number is too low (less than 60), then the jettability of the ink composition using an ink jet printhead will be compromised, especially when using a thermal drop-on-demand printhead.

The invention preferably employs a polyurethane formed from at least one monomer comprising at least two hydroxyl groups and another monomer comprising at least two isocyanate groups. The acid number of the polyurethane is provided by acid groups that are, in turn, provided by the at least one monomer comprising at least two hydroxyl groups. The acid groups are preferably carboxylic acid groups, but any type of acid groups may be used. Examples of monomers comprising at least two hydroxyl groups and at least one carboxylic acid group are 2,2-bis(hydroxymethyl) propionic acid and the hydroxyethylether of 4,4-bis(4-hydroxyphenyl) valeric acid. Other examples are described in U.S. Pat. No. 6,268,101 B1 and U.S. 2003/0184629 A1 and references cited therein.

The polyurethanes are also preferably derived from a monomer having at least two isocyanate groups; diisocyanates are typically used in the art of polyurethane chemistry, but triisocyanates may also be used. Examples of diisocyanates include isophorone diisocyanate and others described in the above references.

The polyurethanes used in the invention are optionally derived from an additional monomer comprising at least two hydroxyl groups and which is different from the monomer having at least two hydroxyl groups and at least one carboxyl group. These optional monomers are typically higher molecular weight monomers having a molecular weight of less than 3000. They are often referred to in the art as polyols and examples include those described in the above references. Examples include polyols and polyhydroxy derivatives of polycarbonates, polyethers, polyesters, polyacetals, polyacrylates, polyester amides and polythioethers. Preferably the optional monomer is a polycarbonate. More preferably, the optional monomer comprising at least two hydroxyl groups is a poly(hexamethylene carbonate) diol.

The polyurethane used in the invention has a weight average molecular weight, Mw, of greater than 10,000. If Mw is less than 10,000, then the ink jet ink composition will not provide adequate stain and scratch resistance. The maximum Mw of the polyurethane is not particularly limited, but is generally dictated by the physical property requirements of the composition and the method by which it will be applied, as discussed below. If the ink composition is used as an ink jet ink for a thermal printhead, then the maximum Mw of the polyurethane is preferably 30,000.

Preferably the present invention employs at least one addition polymer (this term includes copolymers) formed from a mixture of vinyl or unsaturated monomers. Preferably the addition polymer has an acid number 180 to 240, and more preferably of 200 to 240. Preferably the polymer also has a weight average molecular weight less than 18,000, and preferably in the range of 6,000 to 16,000. In one embodiment, the mixture of monomers includes styrenic monomers. Preferred styrenic monomers include, but are not limited to, α-alkylstyrenes, trans-β-alkylstyrenes, alkylstyrenes, alkoxystyrenes, halogenated styrenes, vinyl naphthalenes and mixtures thereof. Specific examples of styrenic derivatives include styrene, α-methylstyrene, trans-β-methylstyrene, 3-methylstyrene, 4-methylstyrene, 3-ethyl styrene, 3-isopropyl styrene, 3-butyl styrene, 3-cyclohexyl styrene, 3,4-dimethyl styrene, 3-chlorostyrene, 3,4-dichloro styrene, 3,4,5-trichloro styrene, 3-bromo styrene, 3-iodo styrene, 3-fluoro styrene, 3-chloro-4-methyl styrene, benzyl styrene, vinyl naphthalene, divinylbenzene, methyl vinylbenzoate ester, vinylbenzoic acid, vinyl phenol, 3-methoxy styrene, 3,4-dimethoxy styrene, 3-methyl-4-methoxy styrene, acetoxystyrene, acetoxymethylstyrene and (t-butoxycarbonyloxy) styrene. The styrenic monomers may be substituted with ionic functionalities such as sulfonate and carboxylate. Specific examples include sodium styrenesulfonate and sodium vinylbenzoate.

In another embodiment, the mixture of monomers includes acrylic monomers. The term "acrylic monomer" as employed herein includes acrylic acid, acrylate esters and derivatives and mixtures thereof. Examples of acrylic acid monomers include but are not limited to alkylacrylic acids, 3-alkylacrylic acids and 3-haloacrylic acids. Specific examples include crotonic acid, cinnamic acid, citraconic acid, sorbic acid, fumaric acid, methacrylic acid, ethacrylic acid, 3-methylacrylic acid, 3-chloroacrylic acid and 3-chloromethacrylic acid.

Examples of acrylate esters include but are not limited to alkyl acrylates, aryl acrylates, alkyloxyalkyl acrylates, alkyloxyaryl acrylates, hydroxyalkyl acrylates, hydroxyaryl acrylates, crotonic esters, cinnamic esters, citraconic esters, sorbic esters and fumaric esters. Specific examples include n-butyl acrylate, methyl acrylate, ethyl acrylate, n-propyl acrylate, isopropyl acrylate, amyl acrylate, hexyl acrylate, n-octyl acrylate, lauryl acrylate, 2-chloroethyl acrylate, phenyl acrylate, benzyl acrylate, allyl acrylate, methyl 3-chloroacrylate, 2-ethylhexyl acrylate, 2-methoxyethyl acrylate, 2-(2-methoxyethoxy)ethyl acrylate, 2-ethoxyethyl acrylate, 2-(2-ethoxyethoxyl)ethyl acrylate, 2-hydroxyethyl acrylate, 2-hydroxypropyl acrylate, glycidyl acrylate, N,N-dimethylaminoethyl acrylate, trifluoroethyl acrylate, 2-sulfoethyl acrylate and the corresponding methacrylates.

Acrylic monomers useful in the present invention also include unsaturated anhydride and unsaturated imide monomers which may be completely or partially hydrolyzed after polymerization to form the corresponding carboxylic acid or amide functionality. Specific examples include but are not limited to maleic anhydride, methylmaleic anhydride, glutaconic anhydride, itaconic anhydride, citraconic anhydride, mesaconic anhydride, maleimide and N-methylmaleimide. Also useful are mono-ester and bis-ester derivatives of the aforementioned.

Other monomers useful in the present invention include acrylamide and derivatives such as but not limited to N-alkyl acrylamides, N-aryl acrylamides and N-alkoxyalkyl acrylamides. Specific examples include N-methyl acrylamide, N-ethyl acrylamide, N-butyl acrylamide, N,N-dimethyl acrylamide, N,N-dipropyl acrylamide, N-(1,1,2-trimethylpropyl) acrylamide, N-(1,1,3,3-tetramethylbutyl) acrylamide, N-methoxymethyl acrylamide, N-methoxyethyl acrylamide, N-methoxypropyl acrylamide, N-butoxymethyl acrylamide, N-isopropyl acrylamide, N-s-butyl acrylamide, N-t-butyl acrylamide, N-cyclohexyl acrylamide, N-(1,1-dimethyl-3-oxobutyl) acrylamide, N-(2-carboxyethyl) acrylamide, 3-acrylamido-3-methyl butanoic acid, methylene bisacrylamide, N-(3-aminopropyl) acrylamide hydrochloride, N-(3,3-dimethylaminopropyl) acrylamide hydrochloride, N-(1-phthalamidomethyl) acrylamide, sodium N-(1,1-dimethyl-2-sulfoethyl) acrylamide and the corresponding methacrylamides.

Besides being derived from styrenic and acrylic monomers, the addition polymers useful in the present invention may have functionality derived from a variety of other types of monomers well known in the art of polymer chemistry. Such monomers include vinyl derivatives and ethylenically unsaturated compounds in general. Examples of these other monomer types include but are not limited to olefins (e.g., dicyclopentadiene, ethylene, propylene, 1-butene, 5,5-dimethyl-1-octene, etc.); halogenated olefins (e.g., vinyl chloride, vinylidene chloride, etc.); α-alkylalkenes, acrylonitriles, acroleins, vinyl ethers, vinyl esters, vinyl ketones, vinylidene chloride compounds, allyl compounds, and ethylenically unsaturated heterocyclic compounds. Specific examples include allyl acetate, allyl caproate, methyl vinyl ether, butyl vinyl ether, methoxyethyl vinyl ether, ethoxyethyl vinyl ether, chloroethyl vinyl ether, 1-methyl-2,2-dimethylpropyl vinyl ether, hydroxyethyl vinyl ether, diethylene glycolvinyl ether, dimethylaminoethyl vinyl ether, butylaminoethyl vinyl ether, benzyl vinyl ether, tetrahydrofurfuryl vinyl ether, vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, N-vinyl oxazolidone, N-vinylimidazole, N-vinylpyrrolidone, N-vinylcarbazole, vinyl thiophene and N-vinylethyl acetamide.

The addition polymers useful in the present invention may be derived from monomers capable of absorbing UV light after polymerization. Examples of such monomers are disclosed and claimed in U.S. Pat. No. 6,699,538. A variety of other types of monomers well known in the art of polymer chemistry can be used. Still other monomer types include multifunctional monomers having some combination of functionality described above.

Addition polymers useful in the present invention are commonly prepared by free radical polymerization of vinyl or ethylenically unsaturated monomers; however, other polymerization methods such as anionic polymerization, cationic polymerization, polyinsertion, and others well known in polymerization chemistry are also suitable. Synthetic techniques well known in the art of polymer chemistry include but are not limited to emulsion polymerization, solution polymerization, suspension polymerization and dispersion polymerization.

In one embodiment the acrylic polymer is a copolymer comprising benzyl methacrylate and methacrylic acid. In another embodiment, the addition polymer is a styrene-acrylic copolymer comprising a mixture of vinyl or unsaturated monomers, including at least one styrenic monomer and at least one acrylic monomer, at least one of which monomers has an acid or acid-providing group.

The following commercially available styrene-acrylic polymers may be employed in the composition of the invention, for example, styrene-acrylic polymer having acid number 240, sold as Joncryl® 70 from S.C. Johnson Co. (Wisconsin, USA); a styrene-acrylic polymer having acid number 230 sold as TruDot™ IJ-4655 from MeadWestvaco Corp. (Stanford, Conn., USA); a styrene-acrylic polymer having acid number 215 sold as Joncryl® 59 from S.C. Johnson Co.; a styrene-acrylic polymer having acid number 215 sold as Joncryl® 57 from S.C. Johnson Co.; a styrene-acrylic polymer having acid number 213 sold as Joncryl® 63 from S.C. Johnson Co.; a styrene-acrylic polymer having acid number 172 sold as TruDot™ IJ-4680 from MeadWestvaco Corp.; an acrylic resin having acid number 160 sold as Vancryl® 68S from Air Products and Chemicals, Inc. (Allentown, Pa.).

Prior to use, preferably the acid groups of the at least two different polymers are partially or completely neutralized. It is preferred that 50% or more of the acid groups of each polymer are neutralized. It is more preferred that 70% or more of the acid groups of each polymer are neutralized. The acid groups may be neutralized with any suitable base, examples of which include inorganic or organic bases such as alkali metal hydroxides, ammonia, mono-, di- and trialkyl- or aryl amines, nitrogen-containing heterocycles; and tetraalkyl- or aryl amines and the like. Specific examples of bases include sodium hydroxide, potassium hydroxide, lithium hydroxide, ammonia, triethylamine, triethanolamine, diethanolamine, 4-ethylmorpholine or dimethylethanolamine. The identity and amount of base used is dependent on the desirable viscosity, jettability through printhead type and print durability and other properties delivered by the ink composition of the present invention. In a preferred embodiment of the invention, an inorganic base such as sodium hydroxide or potassium hydroxide is used.

The polymers employed in the present invention may be either water-soluble, or water-dispersible. By the term "water-soluble" is meant herein that the polymer is dissolved in water such that scattering is not observed when a dilute solution of the polymer is analyzed using dynamic light scattering or any other technique well known in the art of particle analysis. By the term "water-dispersible" is meant herein that the polymer exists in the form of particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

The ratio of the first (preferably a condensation polymer) polymer to the second (preferably an addition polymer) polymer is preferably 1:2 to 4:1. Both may be present in any amount as long as they meet the weight average acid number requirement. Factors that must be considered include durability, resolution and drop size capacity of the printhead, print speed, application method (pre, during or post colored inks) masking pattern, etc., as well as the properties of the ink and recording element used to form the printed image. In general, the first polymer is present in the composition in an amount of up to 20% by weight of the composition. The first polymer is preferably present in an amount of up to 10% by weight of the composition, and more preferably up to 5% by weight of the composition. In general, the second polymer is present in the composition in an amount of up to 20% by weight of the composition, preferably in an amount of up to 10% by weight of the composition, and more preferably up to 5% by weight of the composition. Generally both polymers are present in at least the amount 0.1% by weight.

Particularly when used as a colorless coating in an overcoat format the polymers are present in the ink composition in an amount required to give a protective overcoat of desired water and stain resistance after the overcoat composition has been printed and dried. By the term "stain resistance" is meant herein that, after printing, the imaged recording element does not imbibe water or has a protective overcoat that prevents or minimizes water-based stains from discoloring the imaged side of the imaged-recording element. Furthermore, the overcoat thickness, or dry laydown of polymer, is not particularly limited, and is determined not only by the inherent capacity of that polymer to function as a protective overcoat, but also by numerous other factors as discussed above. The overcoat thickness is not particularly limited, but is preferably up to about 4 µm, and more preferably up to about 2 µm.

The exact choice of ink components will depend upon the specific application and performance requirements of the printhead from which they are jetted and the media type to be printed upon. Thermal and piezoelectric drop-on-demand printheads and continuous printheads each require ink compositions with a different set of physical properties in order to achieve reliable and accurate jetting of the ink, as is well known in the art of inkjet printing. Acceptable surface tensions are typically no greater than 60 dynes/cm, and preferably in the range of 20 dynes/cm to 45 dynes/cm.

When the composition is a substantially colorless composition it may be the same or different from the formulations of the colored inks that are used in that particular printhead or printing system. The ink compositions useful in the invention may include humectants and/or co-solvents in order to prevent the ink composition from drying out or crusting in the nozzles of the printhead, aid solubility of the components in the ink composition, or facilitate penetration of the ink composition into the recording element after printing.

Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, glycerol, 2-methyl-2,4-pentanediol, 1,2,6-hexanetriol, 2-ethyl-2-hydroxymethyl-1,3-propanediol, 1,5 pentanediol, 1,2-hexanediol, and thioglycol; (3) lower mono- and di-alkyl ethers derived from the polyhydric alcohols; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol. Typical aqueous-based ink compositions useful in the invention may contain, for example, the following components based on the total weight of the ink: water 20-95%, humectant(s) 5-70%, and co-solvent(s) 2-20%.

Other components present in the ink compositions of the invention include surfactants, defoamers, biocides, buffering agents, conductivity enhancing agents, anti-kogation agents, drying agents, waterfast agents, chelating agents, light stabilizers, or ozone stabilizers. When the ink is a substantially colorless ink or overcoat composition it may be colored with very small amounts of colorants in order to impart a desired hue to any or all of the printed image, or in some cases, to correct the color balance of a printed image. Useful colorants include pigments, dyes, polymeric dyes, loaded-dye/latex particles, or combinations thereof, and many of these types of colorants are well known in the art of ink jet inks. In general, colorants may be used in an amount of up to about 0.2% by weight of the composition.

If the ink jet ink composition is a colored ink it will also contain a colorant. The colorant can be either a dye or pigment commonly used in inkjet inks. These are well known in the art.

In one embodiment the ink jet ink composition of the invention has excellent printer reliability performance allowing continuous printing of at least 180, 8.5×11 pages (printed in 20 page groups) to be printed at 100 percent ink coverage without operator intervention. Jetting reliability testing is conducted by printing 20 page test groups of 8.5 inch by 11 inch, 100% coverage flat field targets of the ink under test using a thermal ink jet printer, such as the Canon i960. Upon completion of each test group, a single printer clean cycle is performed followed by the printing of a 100% coverage, flat field evaluation print made on porous, glossy photo grade media, such as Kodak Professional Inkjet Photo Paper (EK # 829 3284). During the printing process the printer is visually observed for a decrease in printing speed indicating printhead overheating due to jetting difficulties. In addition, the $20^{th}$ print interval test prints are evaluated for coverage uniformity by immersing test strips in Hawaiian Punch® fruit juice (or similar stain producing liquid) for 1 min followed by a distilled water rinse. Stain free test samples indicate good jetting performance while stained samples indicate unacceptable jetting performance due to nozzle drop out or fouling of the maintenance station components. The point at which either the printer repeatedly prints in a slow manor or generates stained samples determines the jetting lifetime (number of pages jetted) for the ink under test.

The invention further comprises an ink jet ink set comprising at least one substantially colorless ink composition comprising an aqueous medium and at least two different polymers, a first polymer and a second polymer, having a weight average acid number of 70 to 200; and at least one colored ink comprising an aqueous medium and a pigment or a dye. The colored ink may be any suitable ink, such inks being known to those skilled in the art. The polymers and parameters of the substantially colorless ink are as described in detail above. In one embodiment the colored ink also further comprises at least two different polymers as described above.

The ink jet ink composition is applied to a printed image using an ink jet printhead. Any type of printhead may be used including, but not limited to, drop-on-demand printheads which utilize piezoelectric transducers or thermal bubble formation, or continuous printheads which utilize electrostatic charging devices and deflector plates. The invention is particularly suitable for use with a thermal printhead. Examples of printheads useful in the invention include those used in Canon USA, Inc., Hewlett-Packard Co., and Epson America Inc. desktop and wide-format ink jet printers, and in printing systems described in U.S. 2004/0100542 A1; U.S. 2003/0117465 A1; U.S. 2003/0043223 A1; U.S. Pat. No. 6,079,821; U.S. Pat. No. 6,450,619 B1; U.S. Pat. No. 6,217,163 B1; U.S. 2004/0032473 A1, U.S. 2003/0189626 A1, or U.S. 2004/0017406 A1. The printhead used in the invention may be part of any type of conventional inkjet printing system that deposits one or more inks or fluids onto an recording element.

When the composition is a substantially colorless composition the printhead containing the substantially colorless composition may be positioned in any one of the printhead ports intended for use with printheads containing colored inks, or it may be positioned in a printhead port that is intended for use with a colorless ink as described in the above references. The printhead containing the substantially colorless composition may be positioned on the same carriage assembly as the one used for colored inks, or it may be on a separate carriage assembly. The actual jetting of the substantially colorless composition may occur before, after, or at the same time as the colored inks, and either in the same pass as the one that jets the colored inks, or in a different pass.

When the ink jet ink composition is a substantially colorless ink composition it may be applied to a printed image that has been generated by just about any imaging means. Examples of imaging means include ink jet printing, thermal dye transfer printing, silver halide technology, offset printing, etc. It is especially desirable to print the substantially colorless ink composition on a printed image that has been generated by ink jet printing. In this case, virtually any combination of ink jet ink composition and recording element may be used to prepare the printed image. Ink jet ink compositions, well known in the art of ink jet printing, include both dye-based and pigment-based inks, and either may be used to generate the printed image. Representative examples of such inks are disclosed in U.S. Pat. Nos. 5,997,622; 5,985,017; 5,616,174; 5,738,716; 5,536,306; 4,381,946; 4,239,543; and 4,781,758.

The substantially colorless ink composition of the invention can be applied to various recording elements well known in the art of ink jet printing including both porous and swellable types, and either may be used to generate the printed image. Representative examples of such recording elements are disclosed in U.S. Pat. Nos. 6,045,917; 5,605,750; 5,723,211; 5,789,070 and EP 813 978 A1. In a preferred embodiment of the invention, porous recording elements are employed because they dry quickly. In another preferred embodiment of the invention, porous recording elements having high gloss are employed because they render photographic quality printed images.

When the ink composition is substantially colorless it is preferred that the ink be printed in a predetermined pattern or in image specific levels in various portions of the printed image rather than being applied as a uniform overcoating. This type of approach permits selective application of the substantially colorless ink to areas of the image where environmental protection or optical improvements are required and can decrease the total volume of liquid applied to the media resulting in higher image quality, reduced media cockle and lower media ink capacity media requirements. U.S. Pat. No. 5,515,479 teaches one such method for limiting the volume of colored ink used to print an image but it is obvious to one skilled in the art that similar approaches can be utilized for the application of substantially colorless materials.

The invention also comprises an ink jet printing method comprising the steps of:

A) providing an ink jet printer that is responsive to digital data signals;

B) loading said printer with an ink jet recording element;

C) loading said printer with an ink jet ink composition comprising at least two different polymers, a first polymer and a second polymer, having a weight average acid number of 70 to 200; and D) printing on said ink jet recording element using said colorless ink jet composition in response to said digital data signals. In a preferred embodiment the printer comprises a thermal printhead.

The following example is provided to illustrate, but not to limit, the invention.

EXAMPLE

Polymer Characterization

Weight Average Molecular Weight, $M_w$

Polymer samples were analyzed by size-exclusion chromatography using differential viscometry detection and a universal calibration curve as described in: T. H. Mourey and T. G. Bryan, *Journal of Chromatography A*, 964(2002) 169-178. The eluent employed was 1,1,1,3,3,3-hexafluoroisopropanol containing 0.01M tetraethylammonium nitrate. Columns used were two 7.5 mm×300 mm PLGel Mixed-C columns, available from Polymer Labs, and both columns were thermostated at 45° C. The absolute molecular weight distribution was calculated from viscosity data, and a universal calibration curve constructed from narrow-molecular weight poly(methylmethacrylate) standards between 620 (log M=2.79) and 1,450,000 (log M=6.16). Any portion of a polymer distribution appearing beyond the calibration range of the column set was not used for quantitative purposes. The ordinate "$W_n$ (logM)" was proportional to the weight fraction of the polymer at a given molecular weight on a logarithmic scale. Weight average molecular weight ($M_w$) and number average molecular weight ($M_n$) in HFIP at 45° C. are reported.

Calculated Acid Number, AN

Acid number is defined as the amount of KOH (in mg) required to neutralize 1 g of polymer. The acid number for each of the polymers was calculated using the amount of the monomer having a carboxylic acid group, the total amount of the monomers used in the synthesis of the polymer, and the molecular weight of the base used to neutralize the polymer according to the following equation:

$$AN = \left(\frac{\text{amount of } BHMPA \text{ (mol)}}{\text{total amount of monomers (g)}}\right)\left(MW \text{ of base } \left(\frac{g}{mol}\right)\right)(1000)$$

For example, referring to Polyurethane 1 of the Invention, PU-1, that is described below, the acid number was calculated as follows: the amount of the monomer having a carboxylic acid group was 0.432 mol, the total amount of the monomers used in the synthesis of the PU-1 was (136+57.9+107.8) g=301.7 g, and the molecular weight of KOH is 56 g/mol:

$$AN = \left(\frac{0.432 \text{ mol}}{301.7 \text{ g}}\right)\left(56 \frac{g}{mol}\right)(1000) = 80$$

Weight average acid number of polymer mixture=(Wt % of a first polymer×AN of a first polymer)+(wt % of a second polymer×AN of a second polymer)+etc, all divided by 100, wherein the sum of wt % of all polymers equals 100%.

Preparation of Polyurethanes

Polyurethane 1 of the Invention, PU-1

In a 1-liter round bottom flask equipped with thermometer, stirrer, water condenser and a vacuum outlet was placed 136 g (0.068 moles) of poly(hexamethylene carbonate) diol, avg.

$M_n$=2000 (Aldrich 46,116-4). It was dewatered under vacuum at 100° C. The vacuum was released and the following were added at 40° C. while stirring: 57.9 g (0.432 moles) 2,2-bis(hydroxymethyl) propionic acid (BHMPA), 160 g tetrahydrofuran (THF), and 1 mL of stannous octoate (catalyst). The temperature was adjusted to 68° C., and when a homogeneous solution was obtained, 107.8 g (0.485 moles) of isophorone diisocyanate (IPDI) was slowly added, followed by 10 mL THF. The temperature was raised to 72° C. and maintained for about 16 hours to complete the reaction, resulting in an intermediate containing less than 3% of free IPDI. The free IPDI content was monitored by IR spectroscopy of the absorption peak at 2240 wave number.

The reaction mixture was diluted with 200 mL THF, and neutralized with 53.86 g of 45 wt. % KOH solution to achieve 100% stoichiometric ionization based on the amount of BHMPA. Under high shear, 900 mL of distilled water was added and THF was subsequently removed by heating under vacuum to give an aqueous solution of PU-1 at 27.51 wt. % solids. The molecular weights of PU-1 were $M_w$=18,800 and $M_n$=8440; and the AN=80.

Polyurethane 2 of the Invention, PU-2

The procedure was repeated with the following modifications: 140 g (0.070 moles) of poly(hexamethylene carbonate) diol; 57.7 g (0.430 moles) BHMPA; 106.7 g (0.480 moles) IPDI; neutralized with 53.62 g of 45 wt. % KOH solution. The final solution was 32.34 wt. % solids. The molecular weights of PU-5 were $M_w$=12,800 and $M_n$=5620; and the AN=79.

Styrene-Acrylic Polymer of the Invention SA-1

TruDot™ IJ-4655, commercially available from Westvaco Corp., has an acid number of 230 quoted from Wastvaco. A 25% by weight of aqueous solution was prepared by mixing polymer resin, potassium hydroxide and water and stirred at 60 C for 8 hours. Potassium hydroxide was added at 95 mole % based on its acid number. The molecular weight of SA-1 was Mw=16700 and Mn=5670.

Acrylic Polymer of this Invention, A-1

100 g of diethylene glycol (DEG) and 0.25 g of 2,2'-azo-bisisobutyronitrile (AIBN) were charged to a 1-liter, three-neck round-bottom flask equipped with a mechanical stirrer and nitrogen inlet. The resulting solution was purged with nitrogen for 20 minutes and heated to 150 degrees Centigrade in a constant temperature bath. In a separate container, 100 g of DEG, 0.25 g of AIBN, 33.5 g of benzyl methacrylate (BM), and 16.5 g of methacrylic acid (MA) were combined, mixed well, and then added to the first solution over 2 hours. Polymerization was continued for 3 hours. The temperature was reduced to 65-70 degrees Centigrade, and 1 mL each of t-butyl hydroperoxide (10 weight percent) and sodium formaldehyde bisulfite (10 weight percent) were then added. The resulting polymer was isolated and a 20 wt. % aqueous solution prepared by neutralizing the polymer to 65-70 wt. % with potassium hydroxide.

The resulting random copolymer of BM/MA in a 67/33 weight ratio was found to have a number average molecular weight of 4960 and a weight average molecular weight of 7580. The calculated acid number is 215.

Preparation of Ink Compositions

Ink Composition 1 of the Invention, Ink I-1

Ink I-1 was prepared using polyurethane PU-1 described above to give 3 wt. % of polyurethane relative to the total weight of the ink. SA-1 was added at 1 wt. % relative to the total weight of the ink. Other additives included diethylene glycol at 10 wt. %, ethyleneglycol monobutylether (Dowanol® DB from Dow Chemical Co.) at 2.5 wt. %, Silwet® L-77 (Osi Specialties, Inc.) at 0.5 wt. %, and the balance water. The weight average acid number of the composition is 117.5

Ink Composition 2 of the Invention, Ink I-2

Ink I-2 was prepared the same as Ink I-1 except that polyurethane PU-2 was used instead of PU-1. The weight average acid number of the composition is 116.75

Ink Composition 3 of the Invention, Ink I-3

Ink I-2 was prepared the same as Ink I-1 except that acrylic polymer A1 was used instead of PU-1. The weight average acid number of the composition is 113.75

Comparative Ink I-A

Comparative Ink I-A was the same as Ink I-1 except that PU-1 was used at 4 wt. %, and TruDot™ IJ-4655 was not used.

Comparative Ink I-B

Comparative Ink I-B was the same as Ink I-2 except that PU-2 was used at 4 wt. %, and TruDot™ IJ-4655 was not used.

Comparative Ink I-C

Comparative Ink I-C was the same as Ink I-1 except that PU-1 was not used and TruDot™ IJ-4655 was used at 4.4 wt. %.

Printing and Evaluation

Jetting Performance Testing

A Canon i960 Photo Printer from Canon U.S.A., Inc. was modified for bulk delivery of ink to carriage mounted cartridges and used to evaluate the ink compositions described above. Aftermarket ink tanks, obtained from MIS Associates Inc. (ARC BCI-3C-E) were modified by replacing the ink fill port stopper with an injection septa obtained from Borla Inc. (Part # PF0316). The sealed ink tanks were evacuated using a syringe. Ink delivery lines, connecting the ink filled off carriage bulk ink supply tanks to the on carriage ink tanks, were fitted with syringe needles and inserted into the evacuated ink tanks. Upon liquid and pressure equilibration, optimum ink head pressure was achieved by adjusting the height of the bulk ink supply tanks relative to the printer. Jetting reliability testing was conducted by printing 20 page test groups of 8.5 inch by 11 inch, 100% coverage flat field targets of the ink under test. Upon completion of each test group, a single printer clean cycle was performed followed by the printing of a 100% coverage, flat field evaluation print made on Kodak Professional Inkjet Photo Paper (EK # 829 3284).

Jetting Performance Evaluation:

During the printing process the printer was visually observed for a decrease in printing speed indicating printhead overheating due to jetting difficulties. In addition, the $20^{th}$ print interval test prints were evaluated for coverage uniformity by immersing test strips in Hawaiian Punch® fruit juice for 1 min followed by a distilled water rinse. Stain free test samples indicated good jetting performance while stained samples indicate unacceptable jetting performance due to nozzle drop out or fouling of the maintenance station components. (No effort was made to identify the failure mode.) The point at which either the printer repeatedly printed in a slow manor or generated stained samples determined the jetting lifetime (number of pages jetted in Table 1) for the ink under test.

Stain and Wipe Resistance Testing:

For stain and wipe resistance, a test patch of about 25 $cm^2$ was printed at 100% ink coverage for each of the ink compositions and allowed to dry at ambient conditions overnight. Each patch was then stained by placing 0.2 mL of Hawaiian Punch® fruit juice on the surface that filled a dot having a diameter of about 1 cm. After one minute, the fruit juice was wiped up with a Sturdi-Wipes paper towel that had a 500 g weight on top of it. Each ink composition was printed on the following ink jet recording elements:

Epson Premium Glossy Photo Paper (# S041286) from Epson America, Inc.;

Canon Photo Paper Pro (no catalogue #) from Canon U.S.A., Inc.; and

Each of the samples were evaluated for stain and wipe resistance. Stain density was measured using an X-Rite® Model 820; values less than 0.10 are acceptable. Wipe resistance was measured by qualitatively evaluating the surface of the wipe recording element for scratches:

A—no surface scratches
B—very mild scratches
C—severe scratches
D—very severe scratches on the surface and pink/red stain observed The results are shown in Table 1.

TABLE 1

| Ink Composition | No. of Pages Jetted | Stain Density | | Wipe Resistance | |
|---|---|---|---|---|---|
| | | Epson | Canon | Epson | Canon |
| I-1 | 500 | 0.09 | 0.07 | A | A |
| I-2 | 175 | 0.09 | 0.07 | A | A |
| I-3 | >260 | 0.07 | 0.07 | A | A |
| Comparative Ink I-A | 80 | 0.08 | 0.07 | A | A |
| Comparative Ink I-B | 40 | 0.08 | 0.07 | A | A |
| Comparative Ink I-C | 700 | 0.17 | 0.27 | D | D |

The results in Table 1 show that the Inks of the Invention have the best combination of long term jettability and stain and wipe resistance, and the Comparative Inks do not.

The invention has been described in detail with particular reference to certain preferred embodiments thereof, but it will be understood that variations and modifications can be effected within the spirit and scope of the invention.

What is claimed is:

1. An ink jet ink composition comprising an aqueous medium and at least two different polymers, comprising a first polymer having an acid number of from 60 to 100 and a different second polymer having an acid number of 180 to 240, where the acid number of a polymer is defined by the number of milligrams of potassium hydroxide required to neutralize one gram of the polymer, the at least two different polymers together having a weight average acid number of 70 to 200, wherein the weight average acid number of the at least two different polymers equals the sum of the products of the weight percent of each polymer times the acid number of that polymer, and the sum of the weight percent of all polymers equals 100%, and wherein the ink jet ink composition is substantially colorless.

2. The ink composition of claim 1 wherein the at least two different polymers together have a weight average acid number of 80 to 160.

3. The ink composition of claim 1 wherein the polymers are of two different classes of polymers.

4. The ink composition of claim 1 wherein the polymers comprise polyester, polyurethane, or polymers comprising styrene and/or acrylic acid.

5. The ink composition of claim 1 wherein the weight average molecular weight of each polymers is within the range of 6,000 to 30,000 Da.

6. The ink composition of claim 1 wherein the first polymer is a condensation polymer that has a weight average molecular weight of greater than 10,000 Da, and the second polymer is an addition polymer that has a weight average molecular weight of less than 18,000 Da.

7. The ink composition of claim 1 wherein the first polymer is a polyurethane polymer that has a weight average molecular weight of greater than 10,000 Da, and the second polymer is an acrylic polymer that has a weight average molecular weight of less than 18,000 Da.

8. The ink composition of claim 6 wherein the addition polymer is a copolymer comprising benzyl methacrylate and methacrylic acid.

9. The ink composition of claim 6 wherein the addition polymer is a copolymer comprising styrene and acrylic acid.

10. The ink composition of claim 7 wherein the weight ratio of the polyurethane polymer to the acrylic polymer is 1:2 to 4:1.

11. The ink composition of claim 7 wherein the polyurethane polymer has a weight average molecular weight of 10,000 to 30,000 Da.

12. The ink composition of claim 7 wherein the polyurethane polymer has an acid number of 70 to 90.

13. The ink composition of claim 7 wherein the acid number of the polyurethane polymer is provided by carboxylic acid groups.

14. The ink composition of claim 7 wherein the polyurethane polymer is derived from at least one monomer comprising at least two hydroxyl groups and at least one carboxylic acid group and another monomer comprising at least two isocyanate groups.

15. The ink composition of claim 11 wherein the polyurethane is derived from at least a first monomer comprising at least two hydroxyl groups, a second monomer comprising at least two hydroxyl groups and at least one carboxylic acid group, and a monomer comprising at least two isocyanate groups.

16. The ink composition of claim 15 wherein the first monomer is a polycarbonate.

17. The ink composition of claim 1 wherein the acid groups of the polymers are partially or completely neutralized.

18. The ink composition of claim 7 wherein the acid groups of the polymers are partially or completely neutralized.

19. The ink composition of claim 1 wherein 50% or more of the acid groups of each polymer are neutralized.

20. The ink composition of claim 7 wherein 50% or more of the acid groups of each polymer are neutralized.

21. The ink composition of claim 20 wherein the acid groups are neutralized with an alkali metal hydroxides, ammonia, or a mono-, di- or trialkyl- or aryl amine.

22. The ink composition of claim 7 wherein the polyurethane polymer is present in an amount of up to 20% by weight of the composition and the acrylic polymer is present in an amount of up to 20% by weight of the composition.

23. The ink composition of claim 7 wherein the polyurethane polymer is present in an amount of up to 5% by weight of the composition and the acrylic polymer is present in an amount of up to 5% by weight of the composition.

24. The ink composition of claim 7 wherein the polyurethane polymer has a weight average molecular weight of 10,000 to 25,000 Da, an acid number of 70 to 90 wherein the acid number is provided by carboxylic acid groups, and wherein the polyurethane is derived from at least a first polycarbonate monomer comprising at least two hydroxyl groups, a second monomer comprising at least two hydroxyl groups and at least one carboxylic acid group, and a monomer comprising at least two isocyanate groups; wherein the acrylic polymer has a weight average molecular weight of 6,000 to 16,000 Da, an acid number of 200 to 240, and is a copolymer comprising benzyl methacrylate and methacrylic acid; and wherein the acid groups of both polymers are partially or completely neutralized.

25. The ink composition of claim 1 wherein the ink has a jettability of at least 180 pages using a thermal printhead having a nozzle size of less than 20 microns.

26. The ink composition of claim 7 wherein the ink has a jettability of at least 180 pages using a thermal printhead having a nozzle size of less than 20 microns.

27. The ink composition of claim 1 wherein the ink is substantially colorless.

28. An ink jet ink set comprising at least one substantially colorless ink composition comprising an aqueous medium and at least two different polymers, comprising a first polymer having an acid number of from 60 to 100 and a different second polymer having an acid number of 180 to 240, where the acid number of a polymer is defined by the number of milligrams of potassium hydroxide required to neutralize one gram of the polymer, the at least two different polymers together having a weight average acid number of 70 to 200 wherein the weight average acid number of the at least two different polymers equals the sum of the products of the weight percent of each polymer times the acid number of that polymer, and the sum of the weight percent of all polymers equals 100%; and at least one colored ink comprising an aqueous medium and a pigment or a dye.

29. The ink set of claim 28 wherein the at least two different polymers have a weight average acid number of 80 to 160.

30. The ink set of claim 28 wherein the first polymer is a polyurethane polymer that has a weight average molecular weight of greater than 10,000 Da, and the second polymer is an acrylic polymer that has a weight average molecular weight of less than 18,000 Da.

31. The ink set of claim 28 wherein the colored ink further comprises at least two different polymers, a first polymer and a second polymer, together having a weight average acid number of 70 to 200.

32. The ink set of claim 31 wherein the at least two different polymers of the colored ink together have a weight average acid number of 80 to 160.

33. The ink set of claim 31 wherein the first polymer of the colored ink is a polyurethane polymer that has a weight average molecular weight of greater than 10,000 Da, and the second polymer of the colored ink is an acrylic polymer that has an acid number greater than 180 and a weight average molecular weight of less than 18,000 Da.

34. An ink jet printing method comprising the steps of:
A) providing an ink jet printer that is responsive to digital data signals;
B) loading said printer with an ink jet recording element;
C) loading said printer with a substantially colorless ink jet ink composition comprising at least two different polymers, comprising a first polymer having an acid number of from 60 to 100 and a different second polymer having an acid number of 180 to 240, where the acid number of a polymer is defined by the number of milligrams of potassium hydroxide required to neutralize one gram of the polymer, the at least two different polymers together having a weight average acid number of 70 to 200, wherein the weight average acid number of the at least two different polymers equals the sum of the products of the weight percent of each polymer times the acid number of that polymer, and the sum of the weight percent of all polymers equals 100%; and
D) printing on said ink jet recording element using said substantially colorless ink jet composition in response to said digital data signals.

35. The ink jet printing method of claim 34 wherein the printer comprises a thermal printhead.

36. The ink jet printing method of claim 34 wherein the at least two different polymers together have a weight average acid number of 80 to 160.

37. The ink jet printing method of claim 34 wherein the first polymer is a polyurethane polymer that has a weight average molecular weight of greater than 10,000 Da, and the second polymer is an acrylic polymer that has a weight average molecular weight of less than 18,000 Da.

38. The ink jet printing method of claim 34 wherein the ink jet ink is substantially colorless.

* * * * *